United States Patent Office 3,014,576
Patented Dec. 26, 1961

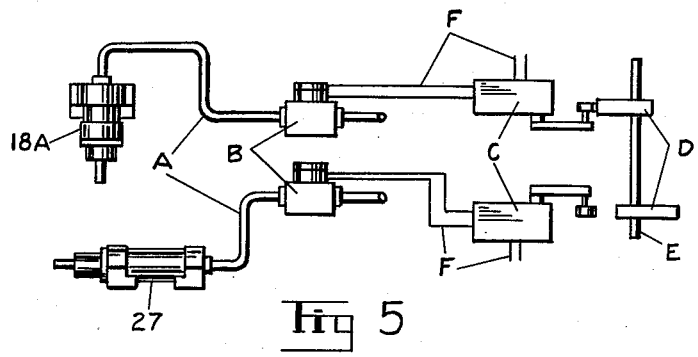
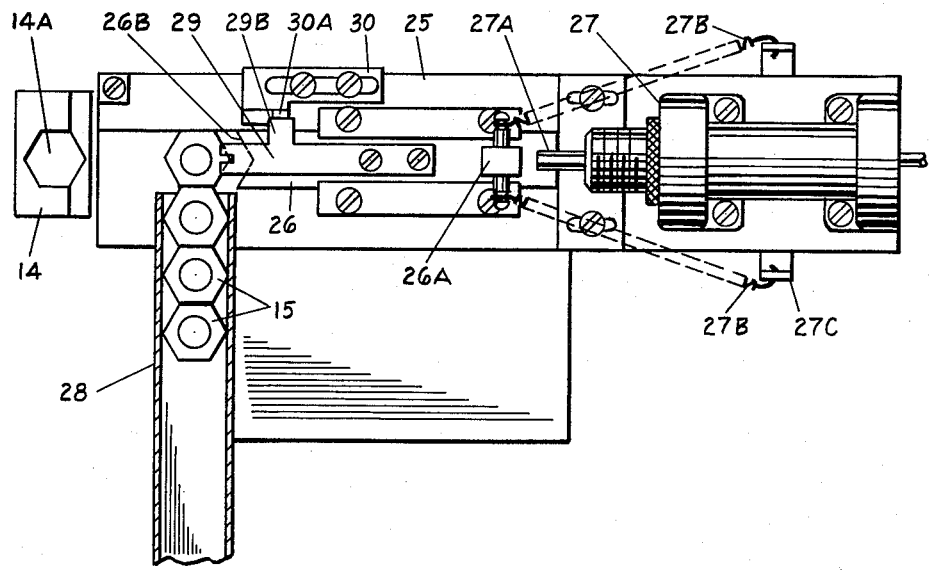

3,014,576
CONVEYOR HANDLING MEANS
Charles S. Pellow, 17311 Prairie Ave., Detroit, Mich., and
Richard A. Pellow, 24709 Winona, Dearborn, Mich.
Filed Jan. 17, 1958, Ser. No. 709,589
6 Claims. (Cl. 198—232)

The present invention relates to means for the automatic loading of conveyors and while addressed specifically to the loading of nuts into the conveyor of a machine for producing castellated nuts is of wider application as will readily appear.

In making castellated nuts, the previously formed nut blanks are each inserted into a collet carried by a conveyor element which then passes to the saw or saws which produce suitable saw cuts in one face of the nut.

Among the objects of the present invention is to provide means for inserting the nuts or other items firmly into the collets in a properly oriented position.

Another object is to provide loading means which is completely automatic in its action, is simply constructed and does not readily become incapacitated.

Other objects will readily occur to those skilled in the art upon reference to the following description and the accompanying drawings in which FIG. 1 is a vertical sectional view on line A—A of FIG. 2.

FIG. 3 is a plan view of the transfer means shown at the right of FIG. 1.

FIG. 4 is an isometric view of the safety control means omitted from FIGS. 1 and 2 for the sake of clarity.

FIG. 5 is a diagrammatic view of the timing means.

Figure 1:
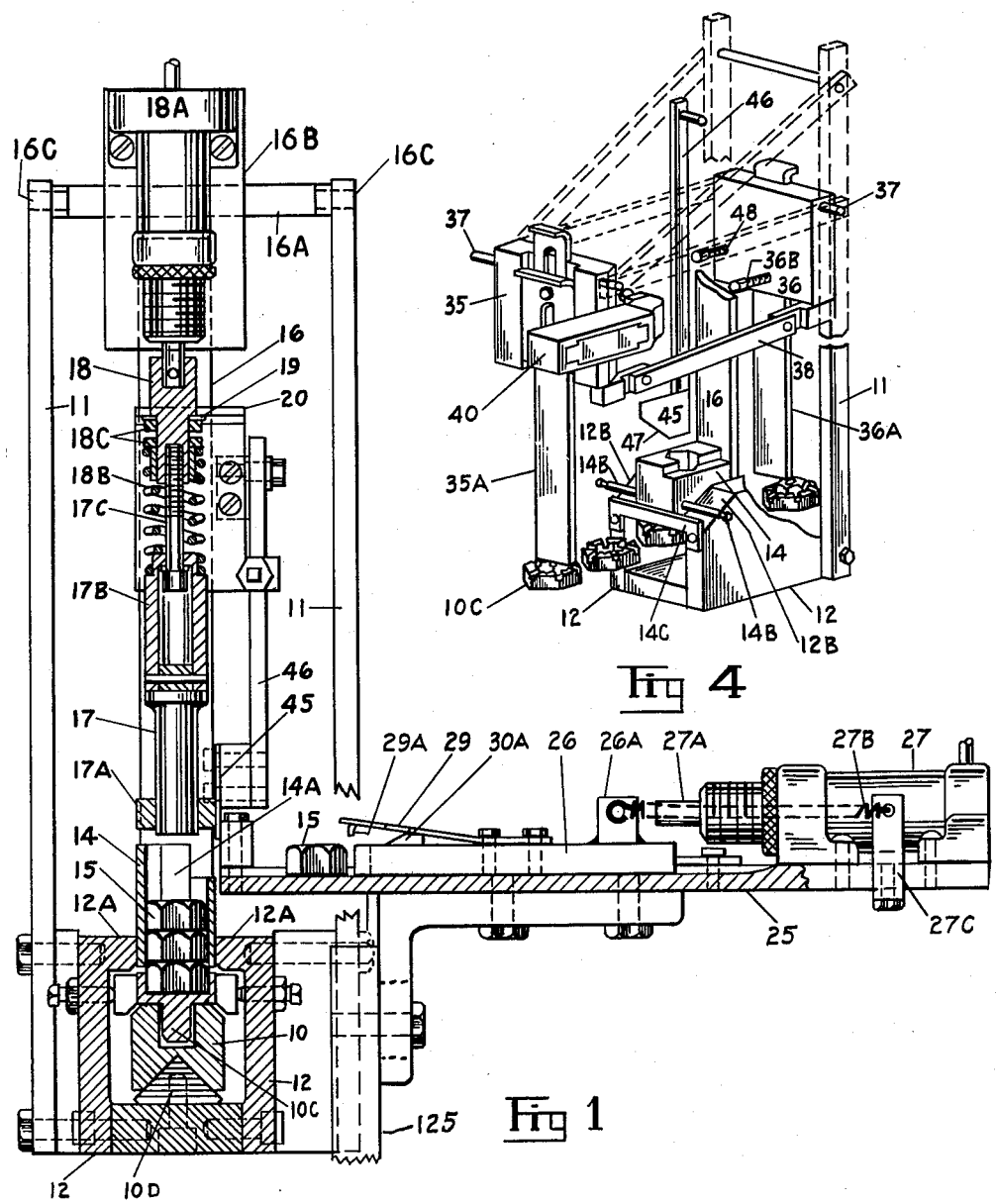
Figure 2:
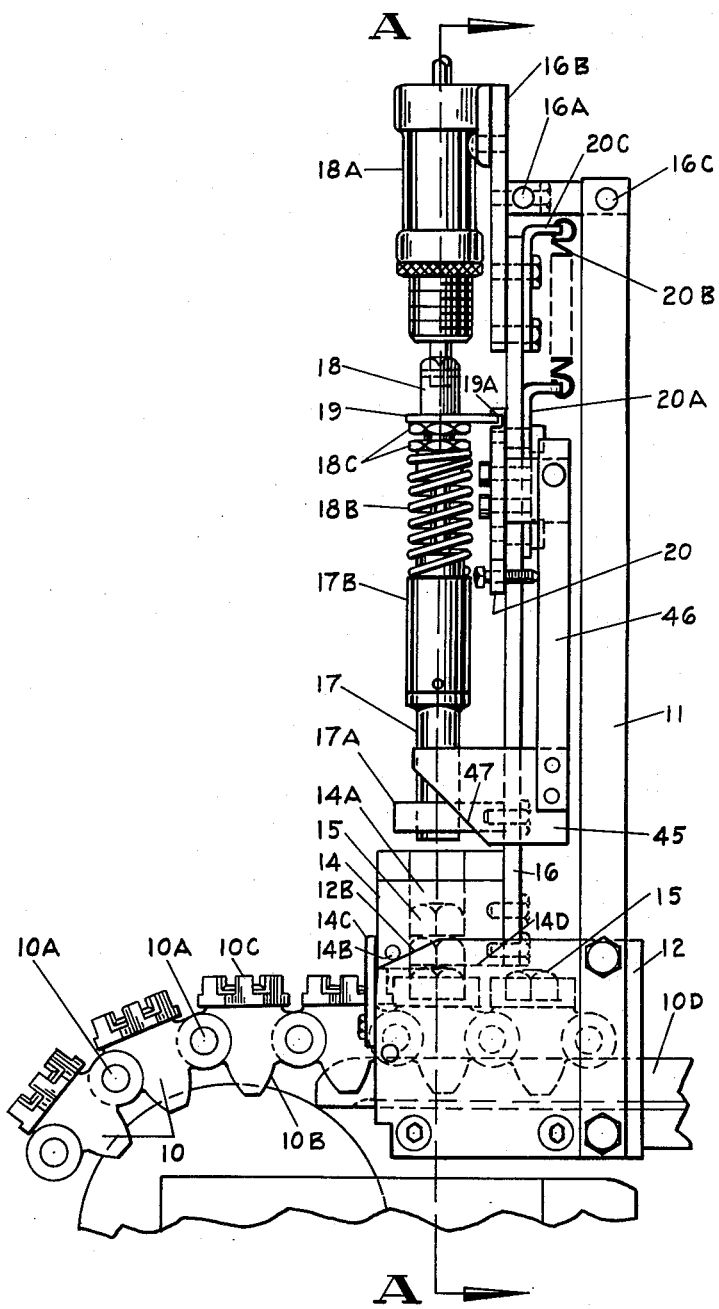
FIG. 2 is a side elevation viewed from the right of FIG. 1.

The loading means for nuts shown in the drawings comprises mechanism positioned adjacent the conveyor which is shown best in FIGS. 1 and 2 as consisting of a series of carriages 10 linked together as at 10A and formed at their bottom portions 10B to cooperate with suitable sprockets (not shown). Each of the carriages 10 carries a collet or chuck 10C adapted to hold one of the nuts 15 to be subsequently castellated. As shown in FIG. 1, the carriages 10, as they pass through the loading mechanism, are supported by a V bar 10D.

The loading mechanism is located at any suitable part of the horizontal travel of the conveyor and consists of a supporting frame 11 having at its bottom portion a pair of plates 12 fixed to the V-bar 10D, extending up on either side to above the collets 10C, and having flange portions 12A extending a short distance toward each other.

Suspended by means to be described, between flanges 12A is a loading block 14 having a vertical through passage of a size and shape to fit the nuts but allow them to slide freely therein.

In its normal active position, the under face of block 14 is at all times spaced slightly above the upper surfaces of the collets 10C, and has the rear portion cut away to allow passage of a nut which has been inserted in a collet. Also, the block is maintained in the forward position, shown in FIG. 2, against the plate 14C due to the inclined faces 12B of the plates 12, and also may be held resiliently by suitable springs (not shown) attached to the pins 14B and to a stationary portion of the machine base.

The block 14 is fixed to the lower end of bar 16 which extends upward and is fixed to an extension plate 16B. This assembly is attached to the upper end of frame 11 by means of a double pivot at 16A and 16C. This double pivot allows the assembly to swing backward and at the same time to move vertically upward.

Also mounted on the bar 16 is a plunger 17 aligned with passage 14A in block 14, a suitable guide therefor being shown at 17A. Plunger 17 is shown as having a hollow cylindrical upward extension 17B within which may reciprocate the head end of a bolt or screw 17C by means of which the plunger 17 is attached to the piston rod extension 18 which is a functionally integral part of the piston rod projecting from a cylinder 18A mounted upon the plate 16B. As will be noted, plunger 17 and piston rod extension 18 are maintained in extended relation by means of a suitable heavy spring 18B surrounding the bolt 17C and acting in compression between shoulders on the parts 17B and 18 respectively. Suitable tension adjusting means for spring 18B is indicated at 18C. The mechanism so far described constitutes the means by which a nut is thrust into one of the collets 10C.

Member 19, provided with a ring portion surrounding extension 18 and fixed against a suitable shoulder by one of the nuts 18C by means of an extension 19A coacts with a plate 20 carried by and having a limited vertical movement upon bar 16. Further, to the plate 20 is fixed another plate 20A to which is attached a spring 20B anchored at its upper end to a bracket 20C fixed to the upper end of bar 16.

The transfer means for moving the nuts into position to be acted on by the foregoing mechanism is shown in detail in FIGS. 1 and 3. It comprises a plate 25 extending laterally of the frame 11 and mounted on the machine base 125 and provided with slides for a transfer plate 26 adapted to be slid toward the block 14 by the piston rod 27A extending from a suitable pressure fluid actuated cylinder 27 and acting against a suitable abutment 26A carried by plate 26.

Also attached to abutment 26A are springs 27B, fixed at their other end to posts 27C in turn fixed to the supporting plate 25. The transfer plate 26 is notched at its forward end as at 26B to fit one of the nuts and in retracted position lies beind the end of a chute or slide 28 supplying the nuts from a suitable hopper (not shown).

Transfer plate 26 also has fixed thereto a spring finger 29 extending a short distance beyond the notched end 26B and provided near its free end with a downward projection or hook 29A and is also provided with a laterally extending pad or ear 29B. Adjustably located alongside the plate 26 is a small plate 30 carrying a came 30A having a sloping forward portion and in position to contact the ear 29B and lift the spring 29 near the end of the backward travel of plate 26 as shown in FIG. 1.

The purpose of the spring 29 and hook 29A is to withdraw from the entrance to the passage 14A any nut that will not enter the passage due to any one or more of several conditions—the nut may be deformed or there may be cuttings or other obstructions or the passage may be full, due to some difficulty.

The operation of the cylinders 18A and 27 is illustrated more or less diagrammatically in FIG. 5 in which each is indicated as supplied with pressure fluid, preferably compressed air, through suitable conduits A controlled by solenoid actuated three-way valves B. The valves B are in turn controlled by suitable switches C actuated by cams D, mounted upon a shaft E rotated by means (not shown) at a speed coordinated with that of one of the sprockets driving the conveyor 10. F indicates the electric conductors leading to the solenoid valves B.

In the operation of the loading means thus far described, the nuts 15 fed into the inclined chute 28 slide, one at a time, on to the plate 25 in front of the transfer plate 26 and as the plunger 27A is actuated by the cylinder 27, the plate moves forward and pushes the nut into the vertical passage 14A in block 14, the nut dropping therein. When the mechanism is to be put in operation, several nuts are placed in passage 14A by hand movement of the transfer plate 26, and plate 25 is adjusted vertically so that the lower surface of the nut next to be loaded into the passage 14A will have a position slightly above the top surface of the nut last loaded; that is, just sufficient to clear. The vertical adjustment of plate 25 is provided for by slotting the leg of the mounting bracket.

After the new nut is in the passage and the plate 26 is drawn back by the springs 27B, cylinder 18A is activated to force the plunger 17 downwardly and thrust the bottom nut into one of the collets, plunger 17 being returned through action of spring 20B, and the return spring provided within the cylinder.

The means so far described is the actual transfer and collet loading means. However, it can happen that a collet approaching the loading means may have a nut already in it, or a nut may not be properly seated in a collet by the plunger 17, or perhaps nuts already in the passage 14A prevent the entrance of a new nut.

Means is therefore provided for preventing breakage or jamming and such means is shown in FIG. 4. Carried on the frame 11 by means of suitable supporting members shown in dotted lines, is a pair of blocks 35 and 36 pivoted as indicated at 37 to permit swinging, the blocks being linked together as by link 38. Each of these blocks carries a depending arm 35A and 36A adjustable in length and extending downward adjacent to the collets 10C, arm 35A clearing an empty collet by a short distance and arm 36A being adjusted to clear by a small distance a nut carrying collet.

Mounted on a suitable stationary part of the frame is an electric switch 40 so arranged that if and when either of the blocks 35 or 36 is swung from its normal position, the block 35 will actuate the switch. This of course will occur if either arm 35A or 36A is moved by, for example, a nut in a collet approaching the loader or an improperly seated nut leaving the loader.

Other means is also provided for swinging the block 35, as is shown in FIG. 4. If, for example, a nut is not thrust down by plunger 17, far enough to clear the lower surface of the block 14, the continued movement of the conveyor will carry along with it the block 14. However, as shown in FIG. 4, block 14 is provided with a pair of laterally extending arms 14B adapted to ride up the inclined surfaces 12B on the plates 12 and if the nut is not cleared by the initial lift of the block, the bar 16 carrying block 14, will strike an adjustable pin 36B carried by block 36, swinging the latter and thereby swinging block 35 so as to actuate switch 40.

A further means for actuating the switch 40 is also shown. This means is in the form of a blade or thin plate 45 carried by a depending arm 46 pivoted at its upper end upon an extension of the plate 20 carried on bar 16. Plate or blade 45 has the forward portion of its lower edge sloped up at an angle as shown at 47 and is so located that as it travels downward with the plunger 17, the sloping edge portion passes into the narrow space between the block 14 and the end of plate 25 supporting the transfer slide. If it meets with any obstruction, the sloping edge portion causes it to be swung back against an abutment 48 carried by the block 36 and thereby activate the switch.

Switch 40 controls the delivery of current to the motor (not shown) that operates the conveyor 10, and when activated, immediately stops conveyor.

We claim:

1. In combination with a conveyor carrying a series of collets, means for loading blanks into said collets, said means comprising a loading block having a vertical passage therein and normally positioned over said collets, the bottom of said block being normally disposed at all times to be spaced slightly above the tops of said collets as same pass thereunder, the passage registering momentarily with a collet opening as the conveyor moves thereunder, means for moving the blanks into said passage, means for thrusting a blank from the passage into a collet when said passage and collet are in registration, and said block having an opening in the side disposed to permit the blanks to be carried out of said passage by the moving collets.

2. In combination with a conveyor carrying a series of collets, means for loading blanks into said collets, said means comprising a loading block having a vertical passage therein and suspended over and normally spaced slightly above said collets, the suspension means for said block comprising a stationary vertically extending frame, a vertically extending bar fixed at its lower end to said block and pivoted at its upper end to the upper end of said frame in such fashion as to allow said bar to swing and simultaneously move longitudinally in a vertical direction, means adjacent the block for temporarily holding it in registering position, means for moving blanks into the passage in said block, means for thrusting a blank from said passage into a collet, said block holding means comprising a stationary plate parallel to said conveyor and having its upper edge inclined upward in the direction of movement of the conveyor and a pin carried by said block and normally resting upon the lower end of said inclined edge, whereby said block is lifted when moved by conveyor movement.

3. In combination with a conveyor carrying a series of collets, means for loading blanks into said collets, said means comprising a loading block having a vertical passage therein and positioned over and normally spaced slightly above said collets, the passage registering momentarily with a collet opening as the conveyor moves thereunder, means for thrusting a blank from said passage into a collet during the registration, and means for supplying blanks to said passage, the latter means comprising a laterally extending supporting plate, a reciprocable member slidable upon said plate in a path in alignment with the passage in said block, means for reciprocating said member and means for supplying a succession of blanks to said plate in front of said member to be thrust by the latter into said passage, said member being provided with means engaging and withdrawing a blank when said blank does not properly enter said passage.

4. In combination with a conveyor carrying a series of collets, means for loading blanks into said collets, said means comprising a loading block having a vertical passage therein and normally positioned over said collets, the bottom of said block being normally disposed at all times to be spaced slightly above the tops of said collets as same pass thereunder, the passage registering momentarily with a collet opening as the conveyor moves thereunder, means for moving the blanks into said passage, means for thrusting a blank from the passage into a collet when said passage and collet are in registration, an electric switch for controlling operation of the conveyor and means operable by an improperly loaded collet and blank for actuating said switch to conveyor stopping position, said actuating means comprising a movable support structure carrying said loading block and being operated by the thrust of the conveyor against a blank which has been improperly placed by the loading device, said support structure being moved thereby causing said engagement with said switch.

5. In combination with a conveyor carrying a series of collets, means for loading blanks into said collets, said means comprising a loading block having a vertical passage therein and normally positioned over said collets, the bottom of said block being normally disposed at all times to be spaced slightly above the tops of said collets as same pass thereunder, the passage registering momentarily with a collet opening as the conveyor moves thereunder, means for moving the blanks into said passage, means for thrusting a blank from the passage into a collet when said passage and collet are in registration, an electric switch for controlling operation of the conveyor, a switch actuating means positioned downstream of said block relative to conveyor motion, said actuating means being operable by an improperly loaded collet and blank for actuating said switch to conveyor stopping position, and a second switch actuating means positioned upstream of the loading block relative to conveyor motion, said second actuating means being actuable to stop said conveyor by an approaching obstruction carried thereby.

6. Loading means for a series of collets carried by a conveyor, comprising a vertically arranged stationary frame adjacent said conveyor, a vertically arranged member pivotally mounted on said frame for limited vertical and swinging movement in the direction of movement of said conveyor, a loading block fixed to the lower end of said member and normally positioned over said collets, the bottom of said block being normally disposed at all times to be spaced slightly above the tops of said collets as same pass thereunder, said block having a vertical passage therethrough so arranged as to register with a collet opening passing thereunder, a plunger and means for reciprocation thereof carried by said member in alignment with said passage, a laterally extending plate adjacent said frame and opposite the normal position of said block, a reciprocable thrust member slidable on said plate and means for reciprocating said thrust member on said plate, means for feeding blanks upon said plate in front of said thrust member to be thrust thereby into the passage in said block, both of said reciprocation means consisting of fluid pressure means, and means for controlling the said fluid pressure means, said controlling means comprising cams operably connected with said conveyor, and means operable by said cams for controlling the operation of said fluid pressure means.

References Cited in the file of this patent

UNITED STATES PATENTS

| | | |
|---|---|---|
| 1,368,583 | Thompson | Feb. 15, 1921 |
| 2,152,970 | Ness | Apr. 4, 1939 |
| 2,503,760 | Murray | Apr. 11, 1950 |
| 2,724,484 | McCoy | Nov. 22, 1955 |